United States Patent Office 2,881,111
Patented Apr. 7, 1959

2,881,111

α-DICHLOROMETHYLDIALKYLBENZHYDROLS

W E Craig, Philadelphia, Pa., and Elwood Y. Shropshire, Marlton, and Harold F. Wilson, Moorestown, N.J., assignors to Rohm & Haas Company, Philadelphia, Pa., a corporation of Delaware No Drawing. Application September 6, 1956
Serial No. 608,197

16 Claims. (Cl. 167—30)

This application is a continuation-in-part of our application Serial No. 414,904, filed March 8, 1954, and now abandoned, which is in turn a continuation of our application Serial No. 384,324, now United States Patent 2,720,548.

This invention concerns α-dichloromethyldialkylbenzhydrols in which the alkyl groups attached to the phenyl rings contain one to four carbon atoms. It also deals with a method for their preparation, with their use as toxicants for controlling bean beetles and with compositions suitable for this purpose.

We discovered that these α-dichloromethyldialkylbenzhydrols, which may also be called 1,1-bis(alkylphenyl)-2,2-dichloroethanols and represented by the structure (R-Phenyl)$_2$C(OH)CHCl$_2$ where R is a lower alkyl group, are highly effective toxicants against the Mexican bean beetle, *Epilachna varivestis*. They not only cause a high mortality of the larvae, but they are also unusually effective against adults. Furthermore, they are remarkable in providing rapid knock-down action, which results in removing these pests from plants and decreasing the extent of feeding. These novel compounds have other advantages which will appear below.

These compounds are prepared by heating a 1,1-bis(alkylphenyl)-1,2,2-trichloroethane (R-phenyl)$_2$CClCHCl$_2$ with an acid of the formula HOOCR', wherein R' is hydrogen or methyl, together with an amount of water at least equivalent to the bis-(alkylphenyl)trichloroethane. The reaction is desirably carried out between 25° and 110° C. and best between 45° and 75° C., the yields of bis(alkylphenyl)dichloroethanols being most favorable within such temperature limits, although the compounds are obtained in lesser yields at higher temperatures.

As is known, the 1,1-bis(alkylphenyl)-1,2,2-trichloroethanes are obtainable from corresponding 1,1-bis(alkylphenyl)-2-chloroethylenes by chlorination. The latter are in turn available from the 1,1-bis(alkylphenyl)-2,2-dichloroethanes, which can be dehydrochlorinated with an alkali metal hydroxide in the presence of a lower alkanol at 60° to 125° C.

In the conversion of a 1,1-bis(alkylphenyl)-1,2,2-trichloroethane to the desired benzhydrol the starting material is heated with aqueous formic or acetic acid or a mixture thereof within the specified temperature ranges. The concentrations of formic acid may be from about 40% to 90% and the acetic acid from 50% to 90%, the rest being water. The aqueous acid is used in excess and supplies an amount of water at least equivalent to the starting material and best in excess.

After the reaction has been carried to the point where hydrogen chloride is no longer evolved, thus being a definite indication of completion of reaction, the reaction mixture is cooled. Layers are formed and separated. The layer containing the product is washed desirably with hot water, with dilute aqueous sodium carbonate solution or an equivalent to remove traces of acid, and again with water. The product may be obtained as an oil which in most cases can be readily crystallized or it may be obtained directly as a solid. It may be recrystallized, if desired.

The following examples are presented to illustrate this invention and are not given by way of limitation. Parts are by weight unless otherwise designated.

Example 1

(a) A solution of 370 parts (4.0 moles) of toluene and 360 parts (2.0 moles) of 1,2,2-trichlorodiethyl ether was stirred and cooled to 5° C. while 1240 parts (12.0 moles) of 96% sulfuric acid was added. The temperature was held between 5° and 10° C. during the sulfuric acid addition. After the reaction mixture was stirred an additional three hours, it was poured into ice water. The organic layer was separated and washed with dilute sodium carbonate solution and then with water. The excess toluene was removed by distillation and the product was crystallized from alcohol. After air drying, the product weighed 418 grams and melted at 43° to 48° C. The material was then recrystallized from octane and again from alcohol to yield 215.1 parts of product, melting point 75° to 78° C. This is essentially the pure p,p'-isomer, 1,1-bis(4-tolyl)-2,2-dichloroethane.

(b) A solution of 214 parts (0.765 mole) of 1,1-bis-(4-tolyl)-2,2-dichloroethane in 200 parts of n-butyl alcohol was stirred while 75 parts (1.15 moles) of potassium hydroxide pellets were added. The mixture was then stirred and heated to reflux for six hours. Ether and water were added and the organic layer was separated. A solid precipitated from the organic part. After crystallization from alcohol there was obtained 145 parts of product, identified as 1,1-bis(4-tolyl)-2-chloroethylene, melting point 67° to 69° C.

(c) A solution of 61 parts (0.25 mole) of 1,1-bis-(4-tolyl)-2-chloroethylene in 252 parts of ethylene dichloride was stirred while chlorine was added. The reaction exothermed to 55° C. and, when the temperature declined, the chlorination was complete. Excess chlorine and solvent were removed under reduced pressure to yield 79 parts of an oily product which could not be distilled or crystallized. This was 1,1-bis(4-tolyl)-1,2,2-trichloroethane.

Analysis.—Calcd. for C$_{16}$H$_{15}$Cl$_3$: Cl, 33.9; hydrolyzable Cl, 11.2. Found: Cl, 34.1; hydrolyzable Cl, 10.4.

(d) A mixture of 48.5 parts (0.16 mole) of 1,1-bis-(4-tolyl)-1,2,2-trichloroethane in 243 parts of 70% aqueous acetic acid was stirred at 60° for five hours. The mixture was allowed to stand and to separate into two phases. The lower acid layer was removed and extracted with benzene. The benzene extract and upper oil layer were combined and washed with dilute sodium carbonate and water. The solid obtained after removal of solvent was crystallized twice from hexane and melted at 100° to 102° C. It was identified as α-dichloromethyl-4,4'-dimethylbenzhydrol.

Analysis.—Calcd. for C$_{16}$H$_{16}$Cl$_2$O: hydrolyzable Cl, 24.1. Found: hydrolyzable Cl, 24.0.

Example 2

(a) 1,1 - bis(4 - tert - butylphenyl) - 2,2 - dichloroethane, melting point 157° to 158° C., prepared by the method of Example 1(a) was dehydrohalogenated by the method of Example 1(b). The product was 1,1-bis(4-tert-butylphenyl)-2-chloroethylene, melting point 100° to 101° C.

Analysis.—Calcd. for C$_{22}$H$_{27}$Cl: Cl, 10.9. Found: Cl, 10.7.

(b) 1,1 - bis(4 - tert - butylphenyl) - 2 - chloroethylene was chlorinated by the method of Example 1(c) to 1,1-bis(4-tert-butylphenyl)-1,2,2-trichloroethane. After crystallation from octane, the product melted at 132° to 133° C.

*Analysis.*—Calcd. for $C_{22}H_{27}Cl_3$: hydrolyzable Cl, 8.9. Found: hydrolyzable Cl, 8.6.

(c) 1,1 - bis(4 - tert - butylphenyl) - 1,2,2 - trichloroethane was hydrolyzed by the method of Example 1(d) to give α - dichloromethyl - 4,4' - di - tert - butylbenzhydrol, melting point 137° to 140° C.

*Analysis.*—Calcd. for $C_{22}H_{28}Cl_2O$: hydrolyzable Cl, 18.7. Found: hydrolyzable Cl, 18.4.

Example 3

By procedures like those shown above 1,1-bis(4-ethylphenyl)-1,2,2-trichloroethane is prepared and 34 parts thereof mixed with 170 parts of aqueous 90% formic acid. The mixture is heated to about 45° C. for five hours. The reaction mixture is treated with 200 parts of water and 150 parts of benzene. The organic layer is taken and washed with dilute sodium carbonate solution and with water. Benzene is removed under reduced pressure to leave an oil which, by analysis, is chiefly (4-$C_2H_5C_6H_4)_2C(OH)CHCl_2$. The yield is 75%.

The above procedure is repeated with aqueous 70% acetic acid. The yield of the same product is 84%.

The procedure is repeated with 90% formic acid with the temperature at 30° C. and the time extended to sixteen hours. The yield of α-dichloromethyl-4,4'-diethylbenzhydrol is 77%.

The procedure is repeated with 34 parts of 70% formic acid and the temperature at 100° C. for one hour. The yield of α - dichloromethyl - 4,4' - diethylbenzhydrol is 35% at this time with 55% of the starting material unconverted.

These and similar preparations show that as the concentration of acid and as the temperatures are increased, a shorter period of time is needed to effect the desired conversion to α-dichloromethyldialkylbenzhydrol and conversely with lower concentrations of acid and/or temperature, longer times are needed. Thus, times may vary from one hour to twenty-four hours depending on these factors.

An optimum range of acid is 60% to 80% with temperatures of 45° to 75° C. with times of four to six hours. Yields then are readily attained of 85% to 95% of the desired products.

The same procedure is applied to the reaction of 1,1-bis(propylphenyl) - 1,2,2 - trichloroethane to give 1,1-bis(propylphenyl)-2,2-dichloroethanol, a particularly effective toxicant. The same reaction is obtained whether the alkyl group on the phenyl ring is straight or branched and whether the alkyl group is in one position or another or a mixture of isomers is used. Ordinarily, the alkyl group is mostly in the 4-position and the 4,4'-isomer is the final product. There may be present, however, some of the 2,2'-isomer and also some 4,2'-isomer, particularly in technical grades of materials. All of these forms are pesticidally active. A procedure for preparing a pure 4,4'-isomer follows.

Example 4

A commercial preparation of 1,1-bis(ethylphenyl)-2,2-dichloroethane (chiefly the 4,4'-isomer) is filtered, separating off an oil yielding a solid with a higher setting point. A solution of 1535 parts (5.0 moles) of this latter material in 616 parts of n-butyl alcohol is heated to 100° to 105° C. while 440 parts (5.5 moles) of 50% aqueous sodium hydroxide is added over a one hour period. The mixture is heated under reflux for an additional 5.5 hours, the water being taken off overhead in a trap. The material is then cooled to 90° C. and washed first with water and then with salt solution. The organic layer is then concentrated at 100° to 110° C./15–30 mm. to yield 98.4% of 1,1-bis(4-ethylphenyl)-2-chloroethylene. This can be purified further by distillation, boiling point 149° to 157° C./0.05 mm. The pure p,p'-isomer melts at 30° C.

This material (407 parts, 1.5 moles) is chlorinated in bulk at 25° to 30° C. No solvent or catalyst is needed. The chlorination is best run under 6" Hg pressure and little or no excess chlorine is used. With rapid stirring and efficient cooling the reaction is complete in three hours. Yields are essentially quantitative and purity is better than 95%. The material solidifies in part on standing. Pure 1,1-bis(4-ethylphenyl)-1,2,2-trichloroethane, melting point 52° to 53.5° C., is obtained by crystallizing the first obtained material from hexane.

*Analysis.*—Calcd. for $C_{18}H_{19}Cl_3$: Cl, 31.2; hydrolyzable Cl, 10.4. Found: Cl, 30.6; hydrolyzable Cl, 10.6.

There are mixed 150 parts of aqueous 70% acetic acid and 100 parts of the pure 1,1-bis(4-ethylphenyl)1,2,2-trichloroethane. This mixture is heated at 60°–70° C. for about six hours. The reaction mixture is cooled, treated with water, washed with dilute sodium carbonate solution and with water. The organic layer is heated at 90° C./15 mm. to remove volatile material. The yield is 95% of practically pure α-dichloromethyl-4,4'-diethylbenzhydrol. It is recrystallized from hexane to give a pure product, melting at 63° to 64° C. It contains by analysis 21.8% of hydrolyzable chlorine (theory 21.9%).

The 1,1-bis(alkylphenyl)-2,2-dichloroethanols are best utilized in the form of compositions from which they are extended with diluents or carriers. These compositions may be emulsifiable concentrates which upon dilution with water provide effective sprays. They may be in the form of wettable powders which are extendable with water to give dilute sprays. Again, the compounds may be mixed with finely divided solids to give dusts. If desired, a wettable powder having a good proportion of one of the compounds can be diluted with a finely divided carrier to give a dust or dusts can be prepared by mixing toxicant, a dispersing agent, and a finely divided solid.

Solvents useful in making emulsifiable concentrates include toluene, xylene, naphthas, particularly aromatic naphthas including methylated naphthalenes, and pine oil. Suitable emulsifiers include various non-ionic wetting and emulsifying agents, such as octylphenoxypolyethoxyethanol, water-soluble reaction products of ethylene oxide and long-chained alcohols, mercaptans, or carboxylic acids, or condensates of polyglycerol and long-chained fatty acids.

For preparing wettable powders there may be used such an agent as one of those just listed or an anionic wetting agent, such as sodium dodecyl sulfate, sodium dioctylsulfosuccinate, sodium octylphenoxyethoxyethyl sulfate or sulfonate. Various anionic agents such as these are also useful for dispersing emulsifiable concentrates.

In formulating wettable powders and also dusts, it is usually desirable to include a dispersing agent, such as a salt of a copolymer from maleic anhydride and an olefinic hydrocarbon, or a soluble salt of condensed naphthalene-formaldehyde sulfonate or a lignin sulfonate.

Solids useful in wettable powders and dusts include clays, pyrophyllite, talc, diatomaceous earth, calcium silicate, magnesium carbonate, or calcium carbonate.

The α-dichloromethyldialkylbenzhydrols may be used as the sole pesticidal agent or may be used in conjunction with other pesticides, including contact poisons, fungicides, or miticides.

A typical self-emulsifiable concentrate may be made from 40 parts of a 1,1-bis(alkylphenyl)-2,2-dichloroethanol, 56 parts of methylated naphthalenes, two parts of an oil-soluble, water-soluble condensate of ethylene oxide and bis(hydroxydiamylphenyl)-methane, and two parts of calcium dioctylsulfosuccinate.

A typical wettable powder is made by mixing twenty-five parts of a 1,1-bis(alkylphenyl)-2,2-dichloroethanol, two parts of the sodium salt of a polymer of maleic acid and diisobutylene, one part of a powder consisting of 40% of octylphenoxypolyethoxyethanol wetting agent on 60% of magnesium carbonate, and seventy-two parts of finely divided clay.

Tests of the various α-dichloromethyldiakylbenzhydrols were made with bean plants infested with bean beetle larvae. At a dilution of two pounds per 100 gallons of spray, kills (determined after 72 hours) are 100% for α - dichloromethyl - 4,4' - dimethylbenzhydrol, or α-dichloromethyl - 4,4' - diethylbenzhydrol, or α - dichloromethyl-4,4'-di-n-propylbenzhydrol. In the case of α-dichloromethyl-4,4'-tert-butylbenzhydrol the kill is 83% while with the corresponding tert-amyl derivative the kill is 50%. Tests made with less pure materials which contained other isomers gave about the same kills as above.

A dosage series was run with the typical compound α-dichloromethyl-4,4'-diethylbenzhydrol in a self-emulsifiable concentrate which was diluted with water and sprayed onto bean plants infested with bean beetle larvae. Kills were 98% at one pound, 91% at 0.5 pound, 85% at 0.25 pound, 68% at 0.125 pound, and 61% at 0.06 pound, all per 100 gallons of spray. There was no feeding down to 0.25 pound and but a negligible amount at the two lowest concentrations. In these tests it was also observed that adults were even more rapidly affected than larvae, an unusual result.

A wettable powder was studied at low concentrations, since in the upper range there was complete kill. At 0.25 pound per 100 gallons, kills were about 93% with the dimethyl, diethyl, and dipropyl substituted α-dichloromethyldialkylbenzhydrols, about 80% at 0.125 pound per 100 gallons, and about 63% at 0.063 pound per 100 gallons. Feeding is zero or negligible in all cases. Field tests with the diethyl derivative as a typical toxicant gave 93% kill at 0.5 pound of compound from a wettable powder, 77% at 0.25 pound, and 67% at 0.063 pound, all per 100 gallons of spray.

Dusts were prepared to contain 5%, 3%, and 1% of the diethyl derivative. Kills of bean beetle larvae were 93%, 93%, and 47% respectively.

The data obtained have shown that the compounds with straight chained alkyl groups are more effective than when branched alkyl groups are used, although the latter, at least up to butyl, provide compounds which are highly effective against bean beetles in their several stages. The α-dichloromethyldialkylbenzhydrols with not over four carbon atoms in the alkyl groups are distinctly more active against such insects as the bean beetle than are the analogous compounds with halogen in place of alkyl. The alkyl-containing compounds are four to eight times as effective as the halogen-containing compounds. The latter are more useful as acaricides. Also, these α-dichloromethyldialkylbenzhydrols are advantageous in being more soluble in organic solvents, in being more readily formulated, in possessing greater safety to plants, in being more readily metabolized by higher animals so as to prevent a fat storage problem, and in being of lower mammalian toxicity, also by a factor of four to eight.

We claim:
1. Compounds of the structure

$$(R\text{-phenyl})_2C(OH)CHCl_2$$

where R is an alkyl group of not over four carbon atoms.

2. A compound according to claim 1 wherein the alkyl group is straight-chained.
3. The compound $$(CH_3C_6H_4)_2C(OH)CHCl_2$$

4. The compound $$(C_2H_5C_6H_4)_2C(OH)CHCl_2$$

5. The compound $$(C_3H_7C_6H_4)_2C(OH)CHCl_2$$

6. The compound $$(C_4H_9C_6H_4)_2C(OH)CHCl_2$$

7. A process for controlling bean beetles on plants which comprises supplying to their environment a compound of the structure $$(R\text{-phenyl})_2C(OH)CHCl_2$$

where R is an alkyl group of not over four carbon atoms.

8. A process for controlling bean beetles on plants which comprises supplying to their environment a compound of the structure $$(CH_3C_6H_4)_2C(OH)CHCl_2$$

9. A process for controlling bean beetles on plants which comprises supplying to their environment a compound of the structure $$(C_2H_5C_6H_4)_2C(OH)CHCl_2$$

10. A process for controlling bean beetles on plants which comprises supplying to their environment a compound of the structure $$(C_3H_7C_6H_4)_2C(OH)CHCl_2$$

11. A process for controlling bean beetles on plants which comprises supplying to their environment a compound of the structure $$(C_4H_9C_6H_4)_2C(OH)CHCl_2$$

12. A pesticidal composition comprising a compound of the structure $$(R\text{-phenyl})_2C(OH)CHCl_2$$

where R is an alkyl group of not over four carbon atoms dispersed in an inert extender.
13. A composition according to claim 12 wherein the extender is a finely divided inert solid.
14. A composition according to claim 13 wherein there is also present a wetting agent.
15. A composition according to claim 12 wherein the extender is an inert organic solvent.
16. A composition according to claim 15 wherein there is present a solvent-soluble emulsifier.

References Cited in the file of this patent
UNITED STATES PATENTS 2,720,548　　Craig et al. _____ Oct. 11, 1955

OTHER REFERENCES

Metcalf: "Organic Insecticides," pp. 135, 208, 209, 210, publ. by Interscience Publishers, Inc., New York (1955).